United States Patent [19]
Okabayashi et al.

[11] Patent Number: 5,719,953
[45] Date of Patent: Feb. 17, 1998

[54] IMAGE PROCESSING APPARATUS FOR DETERMINING POSITIONS OF OBJECTS BASED ON A PROJECTION HISTOGRAM

[75] Inventors: Keiju Okabayashi; Yusuke Yasukawa, both of Kawasaki, Japan

[73] Assignee: Fujitsu Limited, Kanagawa, Japan

[21] Appl. No.: 590,211

[22] Filed: Jan. 23, 1996

Related U.S. Application Data

[63] Continuation of Ser. No. 253,848, Jun. 3, 1994, abandoned.

[30] Foreign Application Priority Data

Sep. 20, 1993 [JP] Japan ................. 5-233196

[51] Int. Cl.⁶ ................. G06K 9/00; G06K 9/34; G06K 9/36; G06K 9/20
[52] U.S. Cl. ................. 382/151; 348/94; 382/153; 382/171; 382/174; 382/283; 382/291; 382/201; 382/203
[58] Field of Search ................. 382/141, 174, 382/190, 191, 192, 283, 203, 271, 153, 168, 171, 291, 151, 201, 206; 348/94, 95, 118; 364/468.22; 358/453; 395/105

[56] References Cited

U.S. PATENT DOCUMENTS

| | | | |
|---|---|---|---|
| 4,466,121 | 8/1984 | Damen et al. | 382/48 |
| 4,727,471 | 2/1988 | Driels et al. | 382/8 |
| 4,849,679 | 7/1989 | Taft et al. | 318/577 |
| 4,885,784 | 12/1989 | Miyagawa et al. | 382/8 |
| 5,065,444 | 11/1991 | Garber | 382/54 |
| 5,068,906 | 11/1991 | Kosaka | 382/48 |
| 5,086,478 | 2/1992 | Kelly-Mahaffey et al. | 382/48 |
| 5,185,811 | 2/1993 | Beers et al. | 382/151 |
| 5,224,177 | 6/1993 | Doi et al. | 382/54 |
| 5,253,305 | 10/1993 | Lin | 382/291 |
| 5,267,325 | 11/1993 | Barron et al. | 382/9 |
| 5,317,652 | 5/1994 | Chatterjee | 382/49 |
| 5,335,297 | 8/1994 | Pullen | 382/50 |
| 5,596,654 | 1/1997 | Tanaka | 382/168 |

*Primary Examiner*—Bipin Shalwala
*Attorney, Agent, or Firm*—Helfgott & Karas, P.C.

[57] ABSTRACT

An image processing apparatus is provided which is capable of a high-speed process for obtaining a projection histogram. A digitizing unit subjects a video signal, obtained by acquiring an image of a target mark with a camera, to horizontal scanning and slicing to obtain a binary signal. A window signal output unit, coupled to the digitizing unit, outputs a window signal in accordance with a preset window area. An in-window signal output unit is connected to the outputs of the digital unit and the window signal output unit to perform a logical AND operation on the binary signal and the window signal and outputs an in-window binary signal. A histogram creating unit is coupled to the output of the in-window signal output unit to create a projection histogram by successively counting the high- and low-level states of the in-window binary signal generated as the horizontal scanning progresses. During a horizontal scanning (image scanning) corresponding to one screen, digitization of the video signal, window setting, and generation of the in-window binary signal are carried out, and further a histogram is created based on the in-window binary signal. Namely, scanning the video signal (image) once is sufficient to create a projection histogram.

10 Claims, 25 Drawing Sheets

| A | B | OUT |
|---|---|-----|
| 0 | 0 | 1 |
| 0 | 1 | 2 |
| 1 | 0 | 1 |
| 1 | 1 | 3 |

FIG. 16

| A | B | C | OUT |
|---|---|---|-----|
| 0 | 0 | 1 | 1 |
| 0 | 1 | 1 | 2 |
| 1 | 0 | 1 | 1 |
| 1 | 1 | 1 | 3 |
| 0 | 0 | 0 | 4 |
| 0 | 1 | 0 | 4 |
| 1 | 0 | 0 | 4 |
| 1 | 1 | 0 | 4 |

FIG. 19

IMAGE PROCESSING APPARATUS FOR DETERMINING POSITIONS OF OBJECTS BASED ON A PROJECTION HISTOGRAM

This is a continuation of application Ser. No. 08/253,848, filed Jun. 3, 1994 now abandoned.

BACKGROUND OF THE INVENTION

(1) Field of the Invention

The present invention relates to an image processing apparatus for determining the position of an object on the basis of a histogram obtained by processing a video signal of the object.

(2) Description of the Related Art

When implementing automation of production lines etc. of a factory, that is, FA (factory automation), a technical procedure is required which is capable of automatically determining the position of an object and which permits a robot or the like to approach the object. In many cases, image processing is used for this purpose. This technical procedure is used also in the case of causing a robot to approach an object in the outer space to perform work. In the production line or in the outer space, objects are usually moving, and accordingly, the image processing should preferably be as fast as possible.

In a conventional image processing method, a projection histogram is obtained, for example, from a video signal of an object, and the position of the center of gravity of the object is determined based on the projection histogram. This method requires a plurality of operations before a projection histogram is obtained, such as image acquisition (image storing), window setting, and digitizing. Further, each of these operations involves image scanning. In this method, therefore, image scanning must be carried out four times, with respect to the image storing, window setting, digitizing, and creation of the projection histogram.

FIG. 25 illustrates the above-described image processing carried out by a conventional image processing apparatus. In the conventional image processing apparatus, a video signal from a camera is stored in a frame memory 180a by means of a first image scanning, a window is set by a second image scanning, a binary signal is generated by a third image scanning, and a histogram is created in a histogram memory 180b by means of a fourth image scanning, as mentioned above. A processor reads the histogram obtained by the fourth image scanning, and determines the position of the object.

Since each of the operations involves image scanning, much time is required before a projection histogram is obtained based on the video signal. Particularly in cases where the position of a moving object is to be determined, time-consuming image processing cannot follow the movement of the object, making accurate access to the object impossible.

SUMMARY OF THE INVENTION

An object of the present invention is to provide an image processing apparatus capable of a high-speed processing for obtaining a projection histogram.

To achieve the above object, there is provided an image processing apparatus for determining a position of an object, based on a histogram obtained by processing a video signal of the object. The image processing apparatus comprises digitizing means for subjecting the video signal to horizontal scanning and slicing to obtain a binary signal, window signal output means for outputting a window signal in accordance with a preset window area, in-window signal output means for performing a logical AND operation on the binary signal and the window signal and outputting an in-window binary signal, and histogram creating means for creating a histogram by successively counting dot clock signals corresponding to high-level in-window binary signals which are generated as the horizontal scanning progresses.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 16 is a chart showing a truth table;

FIG. 19 is a chart showing a truth table;

DESCRIPTION OF THE PREFERRED EMBODIMENTS

An embodiment according to the present invention will be outlined first.

Figure 1:
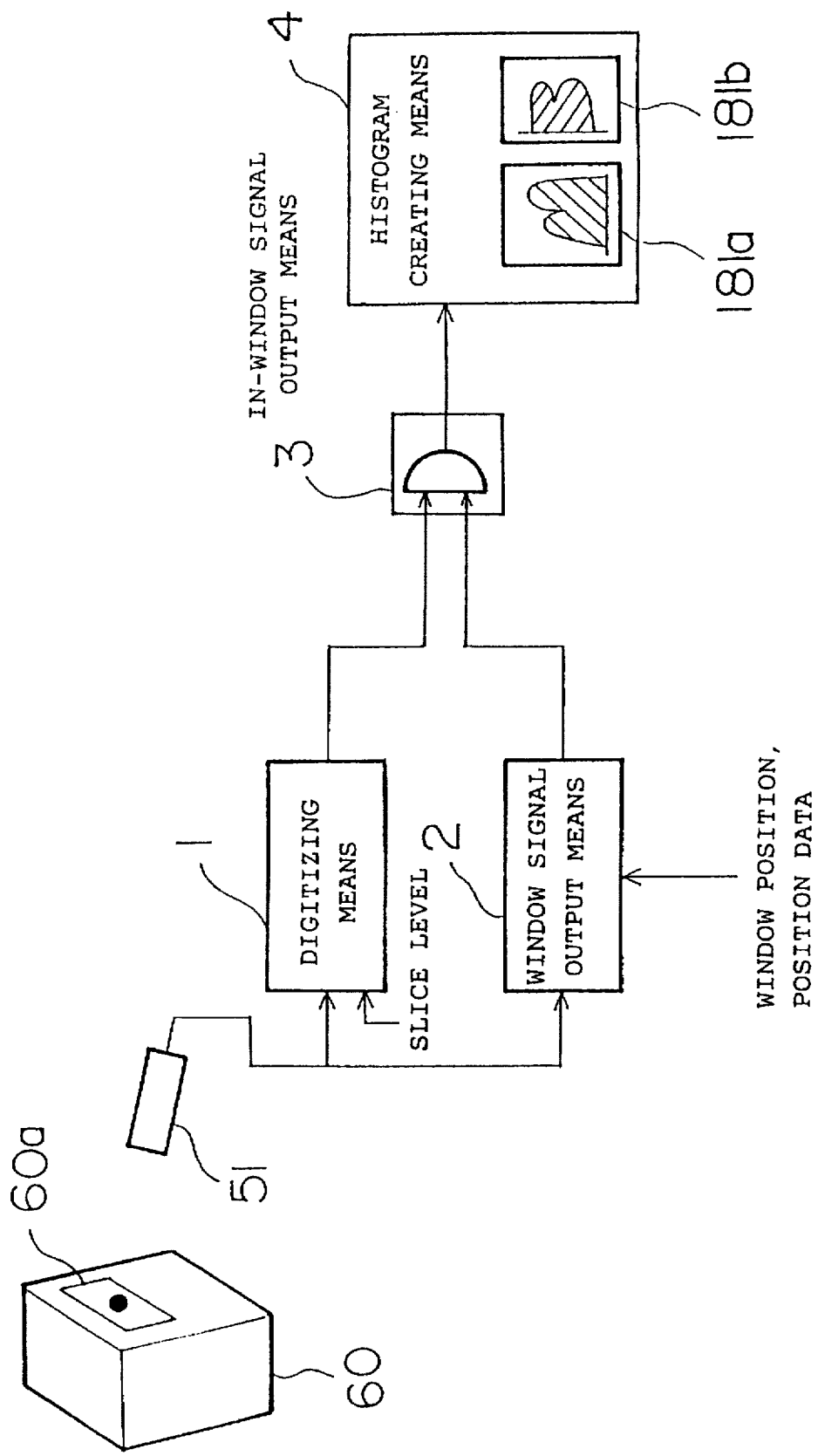
FIG. 1 is a block diagram illustrating principles of the present invention.

FIG. 1 illustrates the principles of the present invention for achieving the aforementioned object. As illustrated in the figure, an image processing apparatus of the present invention comprises digitizing means 1 for subjecting a video signal to horizontal scanning and slicing to obtain a binary signal, window signal output means 2 for outputting a window signal according to a preset window area, in-window signal output means 3 for performing a logical AND operation on the binary signal and the window signal to obtain an in-window binary signal, and histogram creating means 4 for creating a histogram by successively counting dot clock signals corresponding to high-level in-window binary signals which are generated as the horizontal scanning progresses.

The digitizing means 1 generates a binary signal by subjecting the video signal to horizontal scanning and slicing. The video signal is obtained, for example, by acquiring an image of a target mark 60a on an object 60 with a camera 51. The window signal output means 2 outputs the window signal according to the preset window area. The in-window signal output means 3 outputs the in-window binary signal by carrying out a logical AND operation on the binary signal and the window signal. The histogram creating means 4 creates a histogram by successively counting the dot clock signals corresponding to the high-level in-window binary signals which are generated as the horizontal scanning progresses. Thus, during a horizontal scanning operation (image scanning) corresponding to one screen, the binary signal is generated based on the video signal, the window signal is also generated, further, the in-window binary signal is obtained based on the binary signal and the window signal, and a histogram is created based on the in-window binary signal. Namely, only one image scanning of the video signal is sufficient to create a histogram.

The embodiment of the present invention will be now described in detail.

Figure 2:
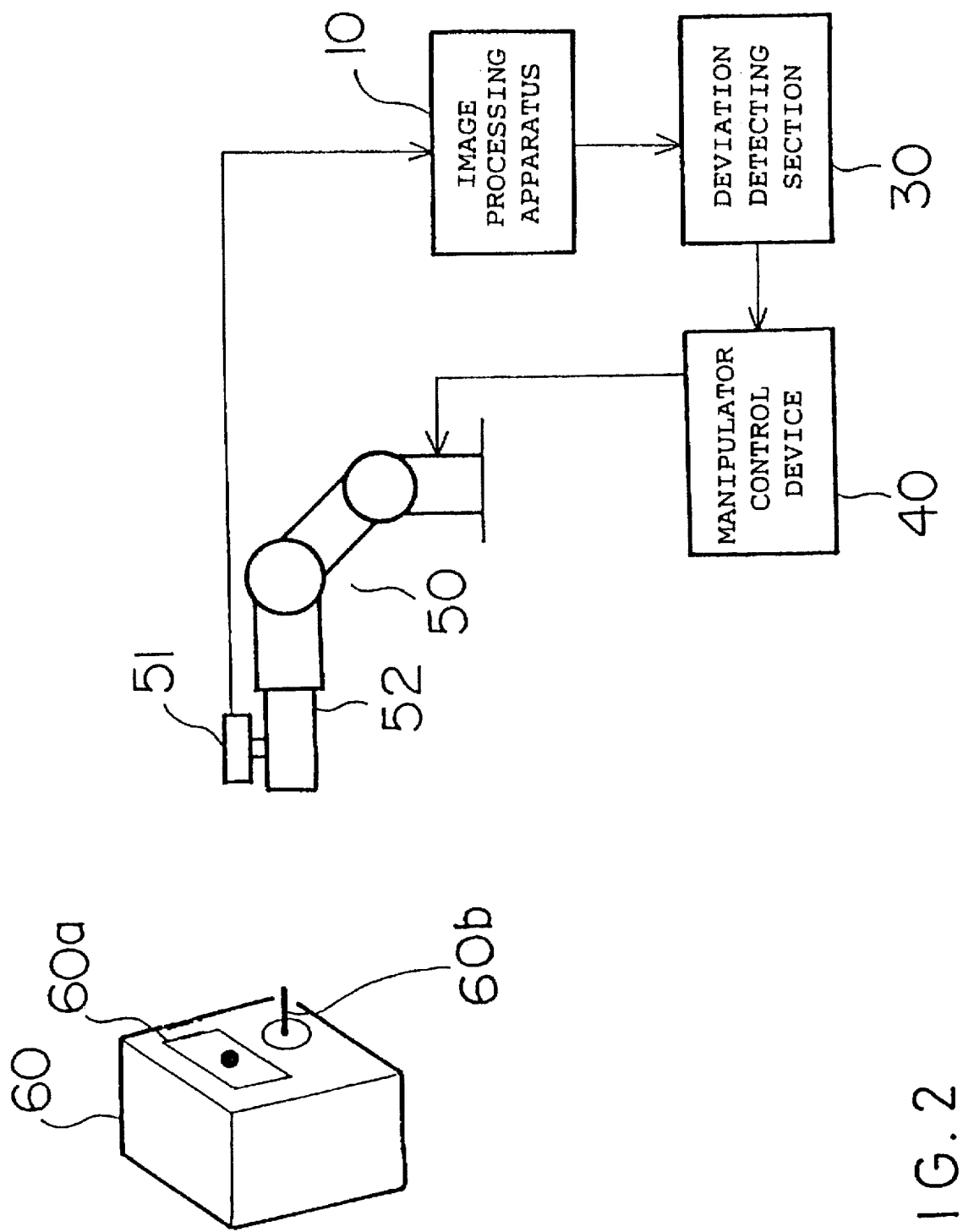
FIG. 2 is a diagram showing the entire configuration of a robot system to which the present invention is applied.

FIG. 2 illustrates the entire configuration of a robot system to which the present invention is applied. In the figure, a robot 50 is a manipulator with six degrees of freedom and has a hand 52 at a distal end thereof, and a camera 51 is mounted on the hand 52. The camera 51 acquires an image of a target mark 60a on an object 60, and a video signal carrying the image is supplied from the camera 51 to an image processing apparatus 10. The image processing apparatus 10 subjects the video signal to image processing according to the present invention, to obtain a histogram. Details of the image processing will be explained later. A deviation detecting section 30 comprises a workstation, for example, and detects an amount of shift of the target mark 60a, based on information including the histogram supplied from the image processing apparatus 10, etc. In accordance with the amount of shift, a manipulator control device 40 controls the motion of the robot 50 such that the camera 51 follows the target mark 60a. While the camera 51 tracks the mark 60a, the robot 50 grasps a handle 60b of the object 60 with the hand 52 to perform a predetermined task. The internal arrangement of the image processing apparatus 10 will be now explained with reference to FIG. 3.

Figure 3:
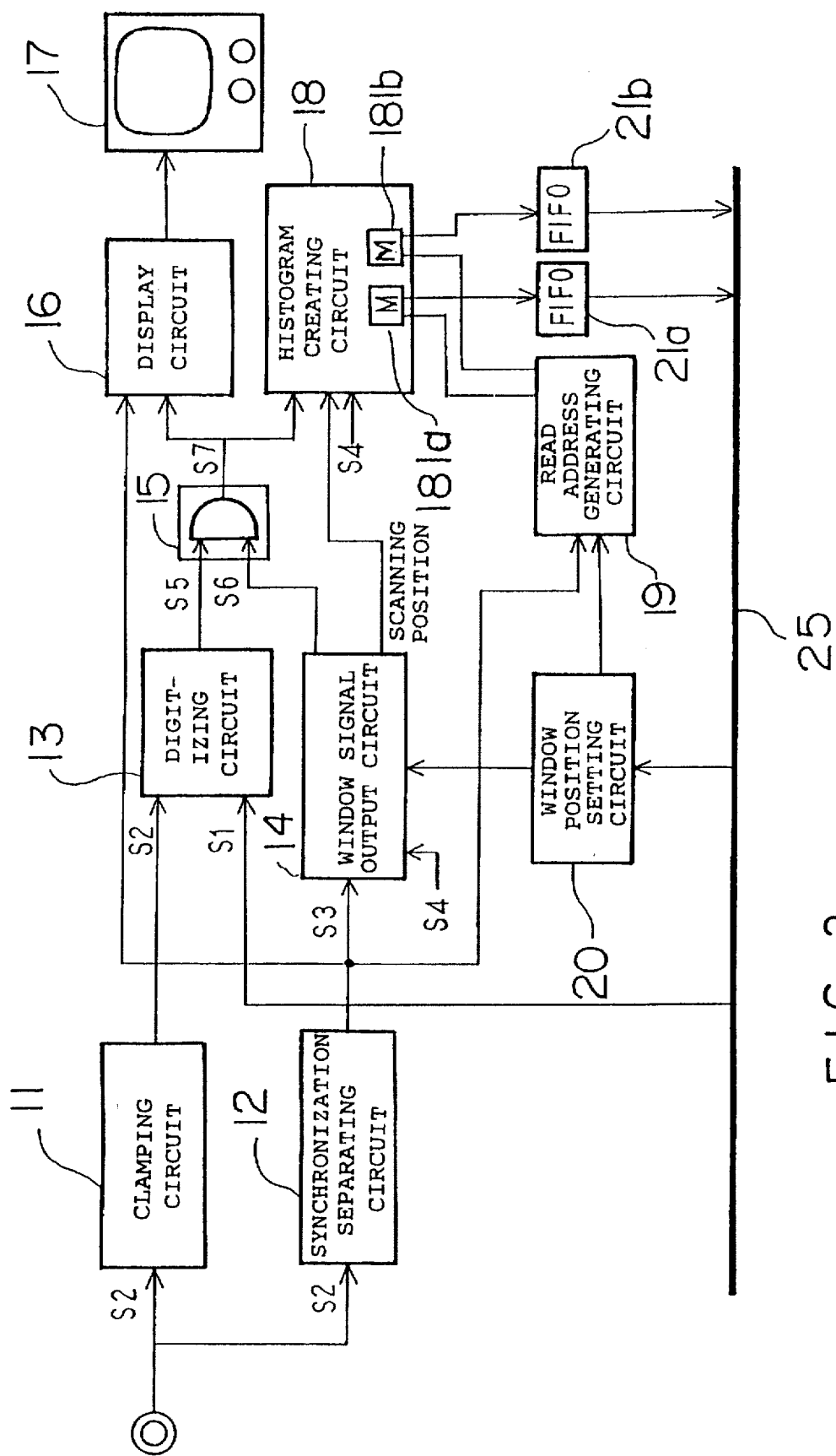
FIG. 3 is a diagram showing the configuration of an image processing apparatus according to the present invention.

FIG. 3 illustrates the configuration of the image processing apparatus according to the present invention. Referring to the figure, a clamping circuit 11 of the image processing apparatus 10 is supplied with a video signal S2 from the camera 51. The clamping circuit 11 clamps a horizontal synchronizing signal contained in the video signal S2 to 0 V, and the resulting video signal is supplied to a digitizing circuit 13. The digitizing circuit 13 slices the video signal S2 from the clamping circuit 11, by using a slice level signal S1 supplied from a processor, not shown, via a bus 25, and outputs a binary signal (binary pulse signal) S5 obtained by the slicing to an in-window signal output circuit 15.

The video signal S2 from the camera 51 is also supplied to a synchronization separating circuit 12. The synchronization separating circuit 12 separates a horizontal synchronizing signal S3 and a vertical synchronizing signal from the video signal S2, and outputs the separated synchronizing signals.

A window signal output circuit 14 is supplied with the horizontal synchronizing signal S3 from the synchronization separating circuit 12, a dot clock signal S4 from a dot clock generating circuit, not shown, and window position data from a window position setting circuit 20, and generates a window signal S6. Also, the window signal output circuit 14 generates scanning position data representing a scanning position for scanning an image.

The window position setting circuit 20 sets a window position defining the window area, in accordance with a command from the processor. The window position data includes a horizontal start position coordinate Xs, a horizontal end position coordinate Xe, a vertical start position coordinate Ys, and a vertical end position coordinate Ye, as mentioned later.

The in-window signal output circuit 15 is supplied with the binary signal S5 from the digitizing circuit 13 and the window signal S6 from the widow signal output circuit 14, performs a logical AND operation on these signals, and outputs the result as an in-window binary signal S7.

A histogram creating circuit 18 is supplied with the in-window binary signal S7, the scanning position data from the window signal output circuit 14, and the dot clock signal S4, and obtains a histogram based on the input signals. Namely, the video signal S2 carrying the image of the target mark 60a is successively processed by means of a horizontal scanning (image scanning) corresponding to one screen, thereby obtaining the in-window binary signal S7, and the histogram creating circuit 18 creates a histogram as it is successively supplied with the in-window binary signal S7. Horizontal direction (X-direction) histogram data is stored in a memory 181a, and vertical direction (Y-direction) histogram data is stored in a memory 181b.

A read address generating circuit 19 is supplied with the window start position data (Xs, Ys) and the window end position data (Xe, Ye) from the window position setting circuit 20, as well as a vertical blanking period start signal from the synchronization separating circuit 12, and outputs read addresses for addressing the window area in the memories 181a and 181b. Specifically, the histogram created and stored in each of the memories 181a and 181b is successively read according to the read addresses during a vertical blanking period, and part of the histogram corresponding to the window area is stored in a corresponding one of first-in/first-out (FIFO) memories 21a and 21b. The processor accesses the first-in/first-out memories 21a and 21b to read the histogram data, and calculates the position of the center of gravity of the target mark 60a.

A display circuit 16 displays the in-window binary signal on the screen of a monitor 17, at a ground-level voltage, a medium-level voltage, or a high-level voltage selected in accordance with the combination of signal states of the in-window binary signal S7 and horizontal synchronizing signal S3. The monitor screen is used for the confirmation of the position of the target mark 60a, the imaging condition, etc.

Figure 4:
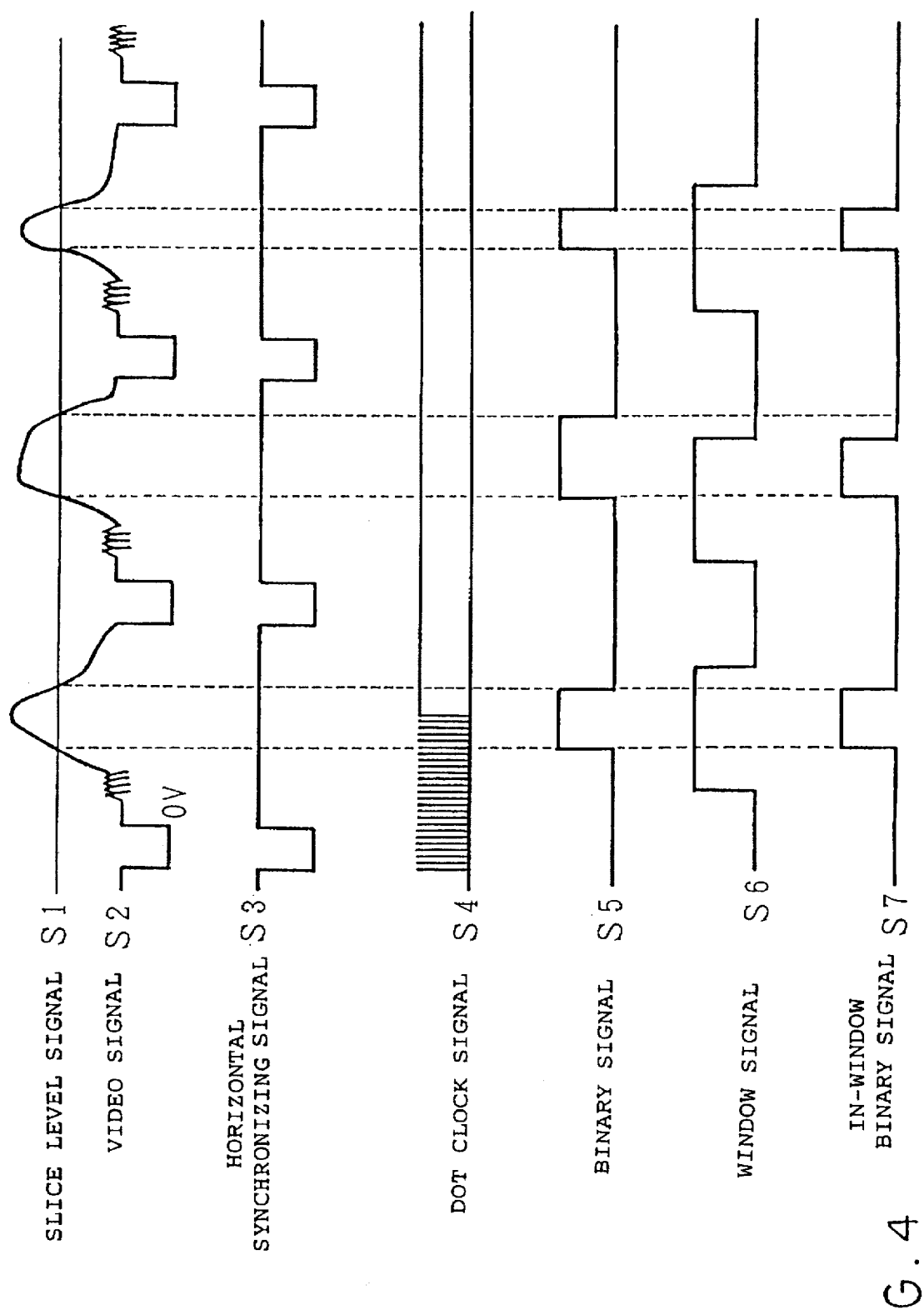
FIG. 4 is a chart showing various signals.

FIG. 4 illustrates the aforementioned various signals. As shown in the figure, part of the video signal S2 corresponding to the horizontal synchronizing signal S3 is clamped to 0 V, as mentioned above. The horizontal synchronizing signal S3 is separated by the synchronization separating circuit 12 (see the third signal from top in the figure). The dot clock signal S4 is, for example, a 12-MHz signal generated in synchronism with the horizontal synchronizing signal S3, and has a number of dots corresponding to the number of pixels in the horizontal direction of the screen. The binary signal S5 is obtained by subjecting the video signal S2 to the slicing by means of the slice level signal S1, as mentioned above. The window signal S6 serves to define the window area, and the result of a logical AND operation performed on the window signal S6 and the binary signal S5 corresponds to the in-window binary signal S7. The histogram is created by counting the dot clock signals S4 for a period during which the value of the in-window binary signal S7 is "1" (high level).

Figure 5:
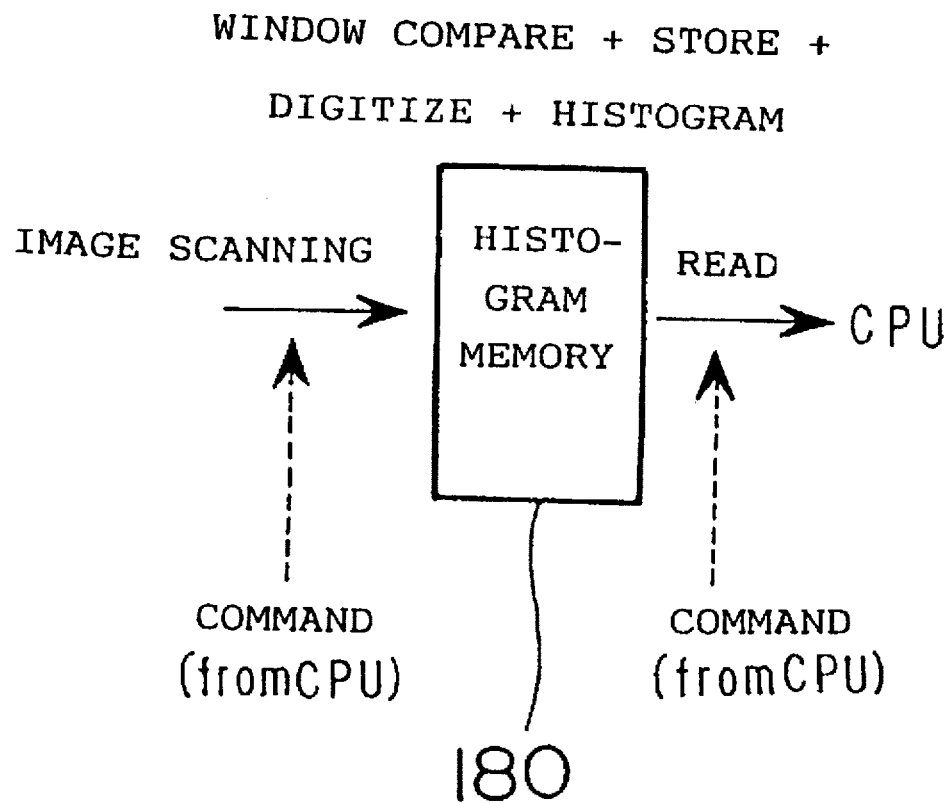
FIG. 5 is a conceptual diagram illustrating how a histogram is created by the image processing apparatus.

FIG. 5 is a conceptual diagram illustrating how the histogram is created by the above image processing apparatus. As shown in the figure, according to the present invention, only one image scanning is sufficient to accomplish the image storing, window area setting, generation of the binary signal, and creation of a histogram, as well as to store the histogram data, which is the result of these operations, in a histogram memory 180. In an NTSC system, image scanning is carried out every 33 ms; therefore, a histogram can be obtained every 33 ms. The processor reads the histogram and calculates the position of the center of gravity of the target mark 60a. Namely, image processing can be performed about 30 times in each second, thus permitting the manipulator control device 40 to receive feedback data on a real-time basis. Accordingly, the moving target mark 60a can be accurately tracked and grasped by the robot 50.

The arrangements of the aforementioned various circuits will be now described in detail.

Figure 6:
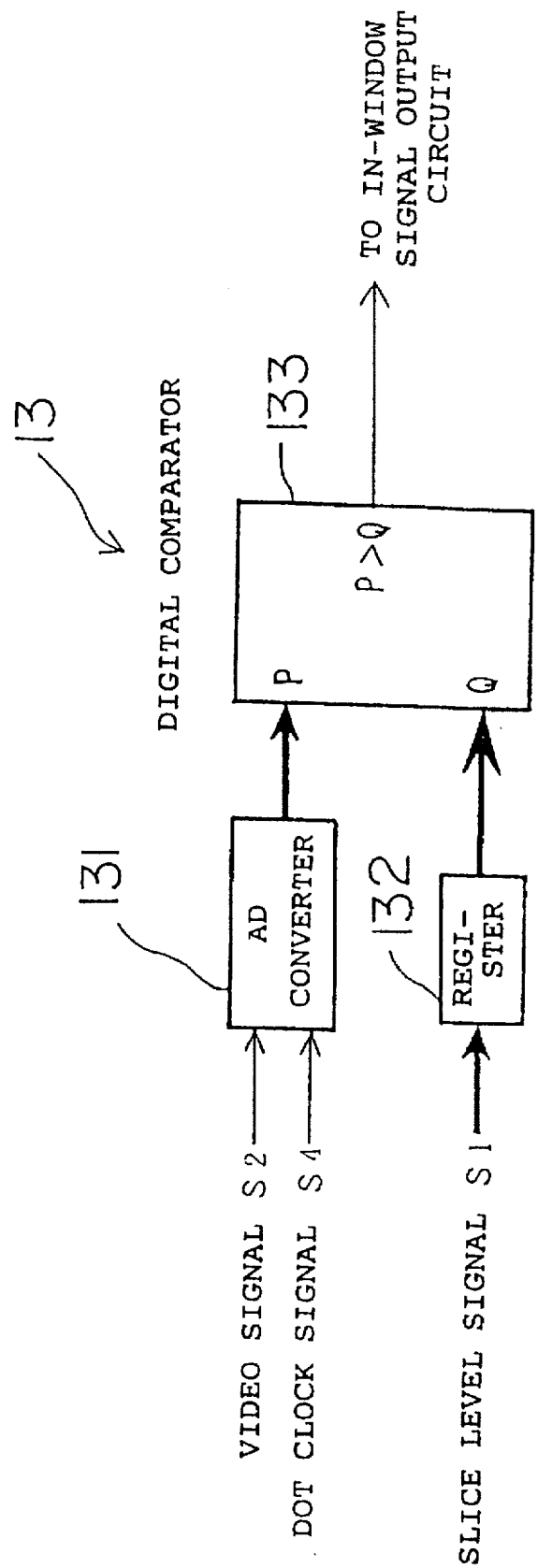
FIG. 6 is a diagram showing an example of the arrangement of a digitizing circuit.

FIG. 6 illustrates an example of the arrangement of the digitizing circuit. In the figure, an AD converter 131 converts the video signal S2, in combination with the dot clock signal S4, into a digital signal. A digital comparator 133 compares the digital signal with the slice level signal S1 supplied thereto from the processor via a register 132, carries out the slicing operation, and outputs the binary signal S5 to the subsequent in-window signal output circuit 15.

Figure 7:
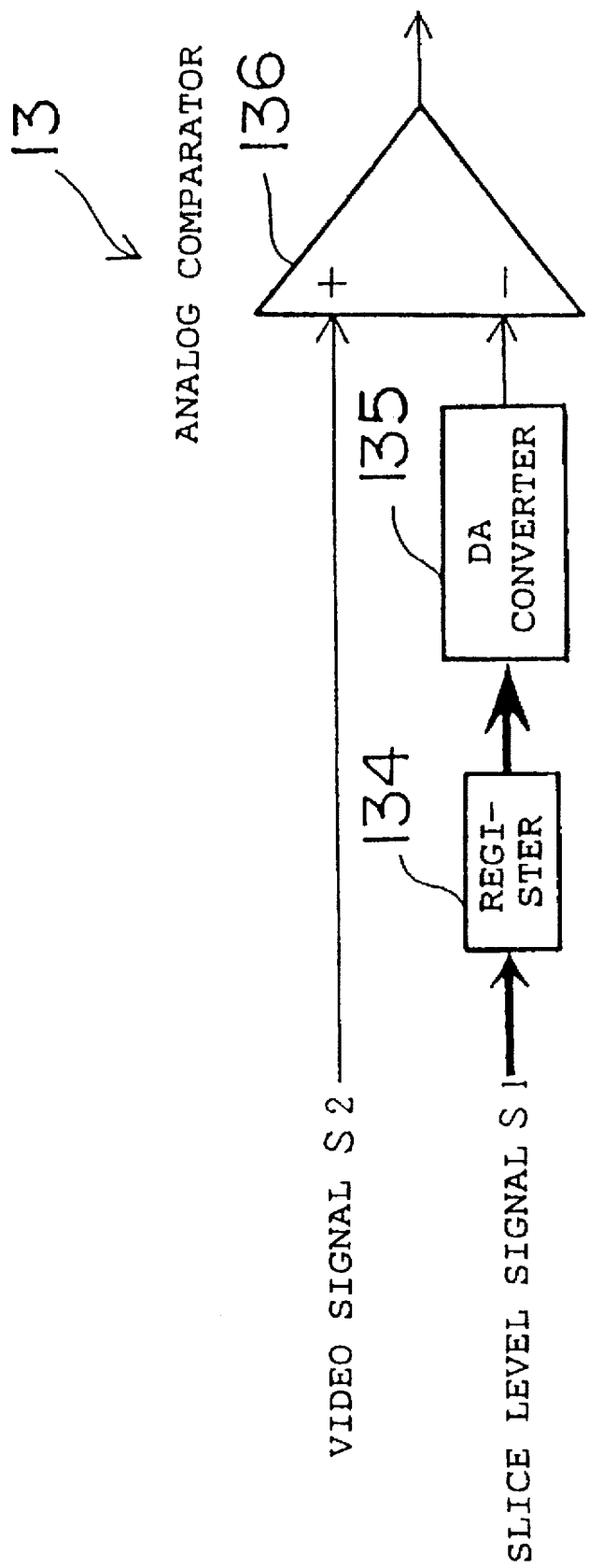
FIG. 7 is a diagram showing a second example of the arrangement of the digitizing circuit.

FIG. 7 illustrates a second example of the arrangement of the digitizing circuit. While the first example uses a digital comparator for the comparison between the signals, the second example uses an analog comparator for the signal comparison. Specifically, an analog comparator 136 is supplied with the video signal S2, as well as a slice level signal which is an analog signal obtained by converting the slice level signal S1, supplied from a register 134, by a DA converter 135. The analog comparator 136 compares the video signal S2 with the slice level signal Sl, performs the slicing operation, and outputs the binary signal S5 to the subsequent in-window signal output circuit 15.

Figure 8:
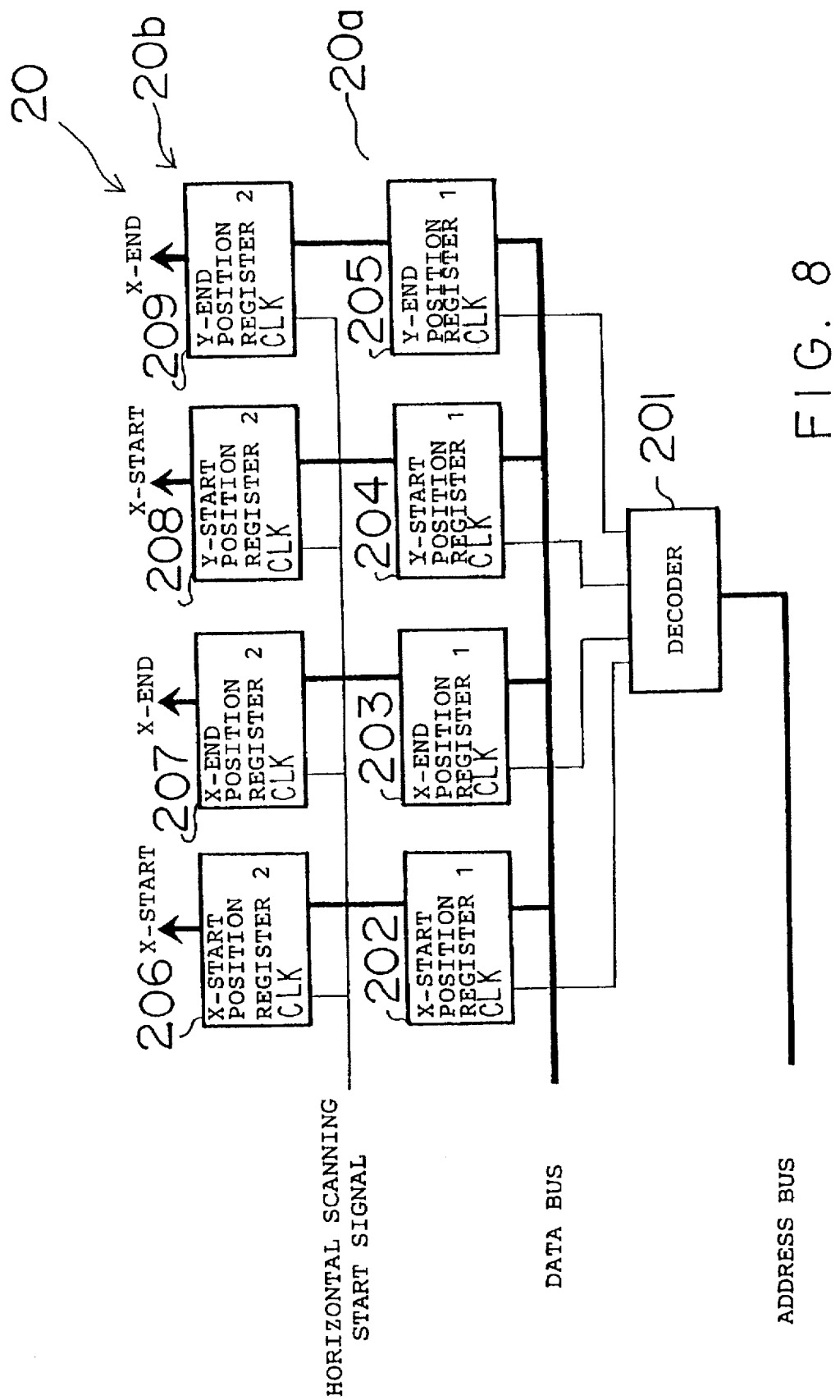
FIG. 8 is a diagram showing the arrangement of a window position setting circuit.
Figure 9:
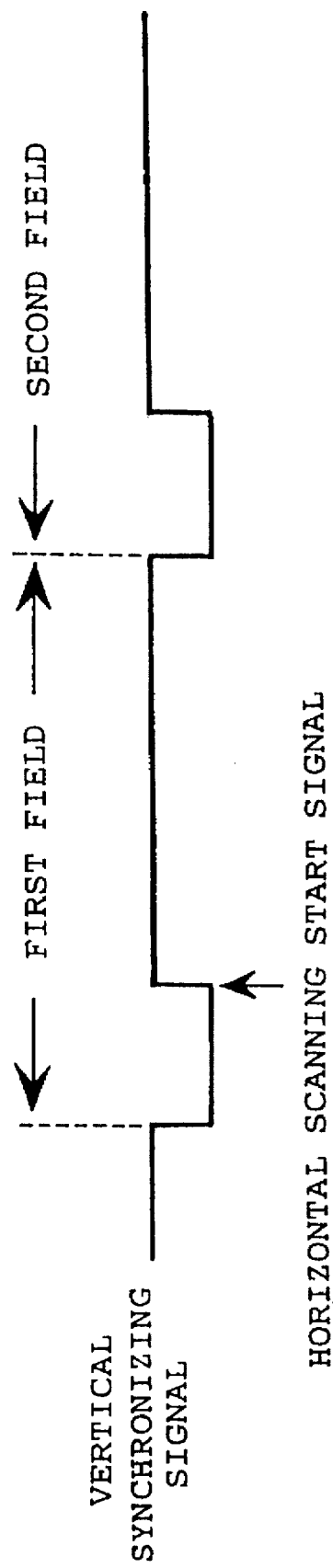
FIG. 9 is a chart showing timing for duplicating window position data.

FIG. 8 illustrates the arrangement of the window position setting circuit. As shown in the figure, the window position setting circuit 20 is composed of a decoder 201, a first register group 20a, and a second register group 20b. The decoder 201 decodes an address signal supplied thereto via an address bus, and specifies one of registers 202, 203, 204 and 205 forming the first register group 20a. The specified one of the registers 202 to 205 makes a copy of the window position data supplied through a data bus. The rewrite timing can be set as desired, and the processor can write data at any desired timing. The window position data written in the first register group 20a is duplicated in respective registers 206, 207, 208 and 209 forming the second register group 20b, in synchronism with the rise of a horizontal scanning start signal following the vertical synchronizing signal, as shown in FIG. 9. Namely, the window position data of the first register Group 20a is duplicated in the second register group 20b at the beginning of a horizontal scanning corresponding to one screen (first field+second field). The window signal output circuit 14 reads the window position data written in the second register group 20b, and sets the window area.

Figure 10:
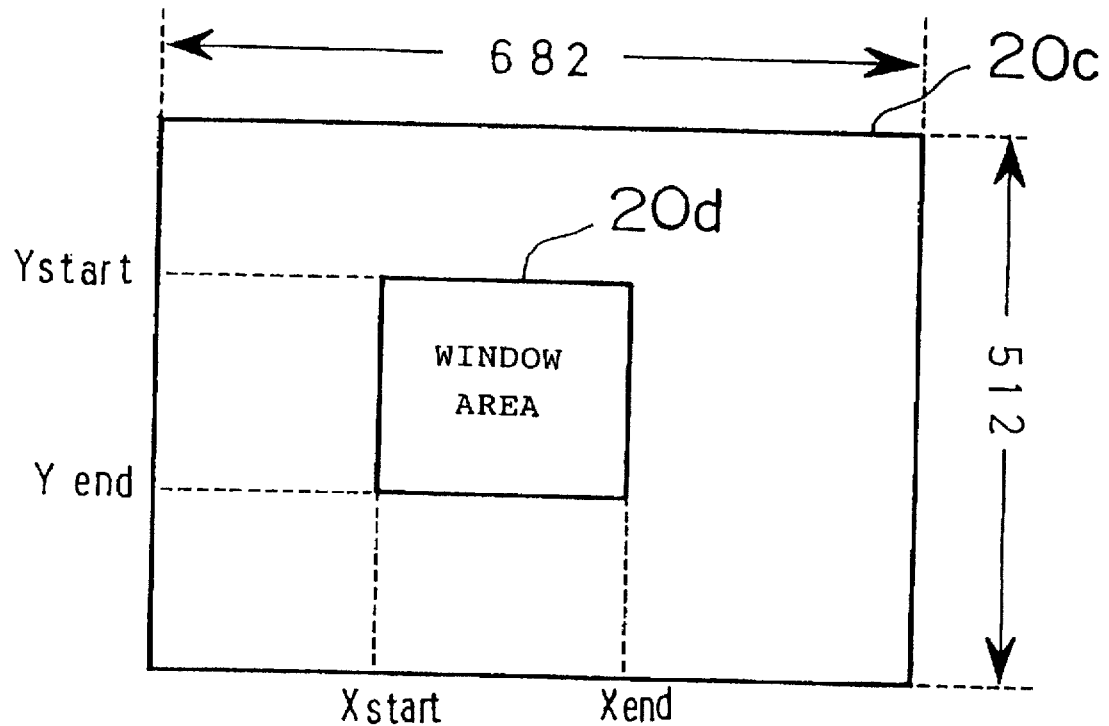
FIG. 10 is a diagram illustrating the window position data.

The window position data specifies a window area 20d within a frame 20c, as shown in FIG. 10, and consists of the horizontal start position coordinate Xs, the horizontal end position coordinate Xe, the vertical start position coordinate Ys, and the vertical end position coordinate Ye. The horizontal coordinates Xs and Xe correspond to respective counts of the dot clock signals S4, and the vertical coordinates Ys and Ye correspond to respective horizontal scanning lines.

Thus, the window position setting circuit 20 is constituted by two stages of register groups 20a and 20b; accordingly, software (processor) can perform the window setting without regard to hardware timing. Further, the window area setting, which is carried out in parallel with the horizontal scanning, can be prevented from being altered in progress.

Figure 11:
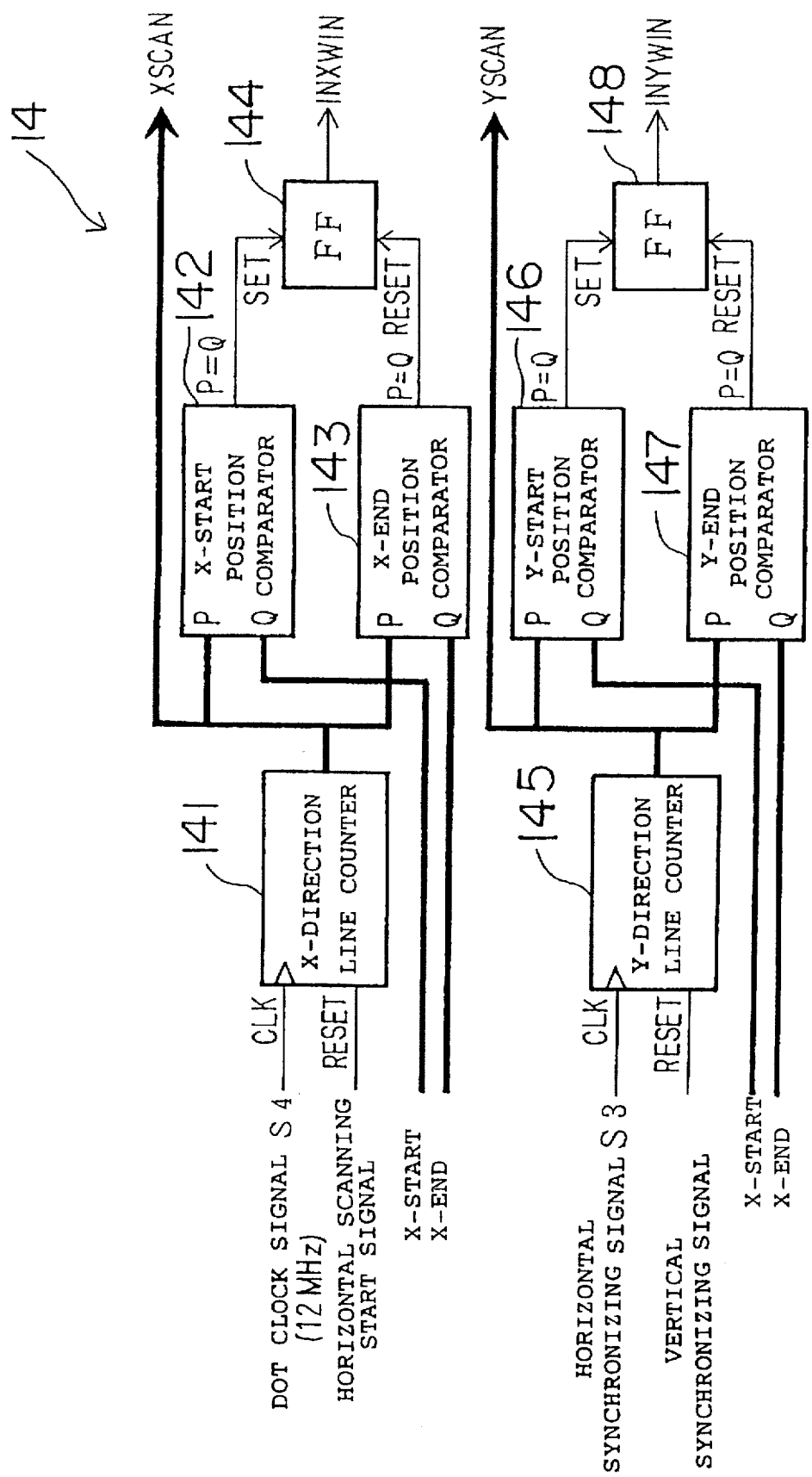
FIG. 11 is a diagram showing the arrangement of a window signal output circuit.

FIG. 11 illustrates the arrangement of the window signal output circuit. In the figure, an X-start position comparator 142 compares the X-direction (horizontal direction) start position Xs, supplied from the window position setting circuit 20, with the number of the dot clock signals S4 counted by an X-direction line counter 141, and when the two values coincide, the comparator 142 outputs a signal to set a flip-flop 144. An X-end position comparator 143 compares the X-direction end position Xe, supplied from the window position setting circuit 20, with the number of the dot clock signals S4 counted by the X-direction line counter 141, and when the two values coincide, the comparator 143 outputs a signal to reset the flip-flop 144. As a result, the flip-flop 144 outputs a signal INXWIN which assumes "1" (high level) during the interval from Xs to Xe. The X-direction line counter 141 is reset by the horizontal scanning start signal.

A Y-start position comparator 146 compares the Y-direction (vertical direction) start position Ys, supplied from the window position setting circuit 20, with the number of the horizontal synchronizing signals S3 counted by a Y-direction line counter 145, and when the two values coincide, the comparator 146 outputs a signal to set a flip-flop 148. A Y-end position comparator 147 compares the Y-direction end position Ye, supplied from the window position setting circuit 20, with the number of the horizontal synchronizing signals S3 counted by the Y-direction line counter 145, and when the two values coincide, the comparator 147 outputs a signal to reset the flip-flop 148. As a result, the flip-flop 148 outputs a signal INYWIN which assumes "1" (high level) during the interval from Ys to Ye. The Y-direction line counter 145 is reset by the vertical synchronizing signal.

The above signals INXWIN and INYWIN are subjected to a logical AND operation at an AND circuit, not shown, and the result is output as the window signal S6 which turns to high-level within the window area.

In FIG. 11, the counter outputs XSCAN and YSCAN are signals representing the image scanning positions in the X- and Y-directions, respectively, and are used for the creation of a histogram or in the arrangement using a frame memory, described later.

The window signal S6 output from the window signal output circuit 14 is supplied to the in-window signal output circuit 15, as mentioned above with reference to FIG. 3. The in-window signal output circuit 15 performs a logical AND operation on the window signal S6 and the binary signal S5 supplied from the digitizing circuit 13, and outputs the result as the in-window binary signal S7.

Figure 12:
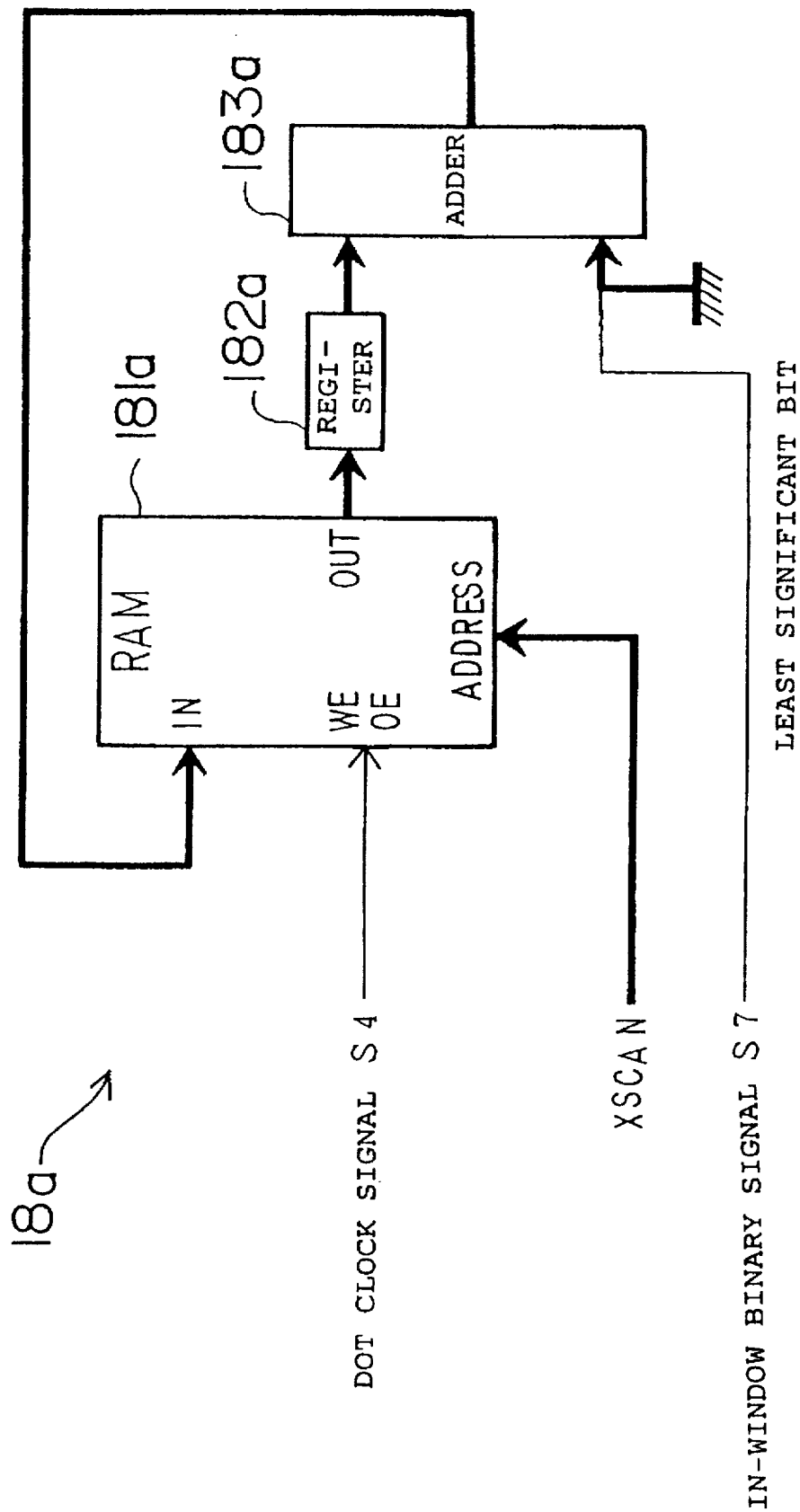
FIG. 12 is a diagram showing the arrangement of an X-direction histogram creating circuit.

FIG. 12 illustrates the arrangement of an X-direction histogram creating circuit 18a. The X-direction histogram creating circuit 18a includes a memory (RAM) 181a corresponding to an X-direction line. The memory addressing is timed with the dot clock signal S4, by using the counter output XSCAN from the window signal output circuit 14. The addressed value in the memory 181a is output to an adder 183a via a register 182a. The adder 183a adds together the least significant bit of the thus-obtained value and the value "0" or "1" indicated by the in-window binary signal S7, and supplies the resulting sum to the memory 181a to be stored at exactly the same location from which the memory value has been read. This operation is successively carried out in accordance with the counter output XSCAN, whereby an X-direction histogram is created in the memory 181a.

Figure 13:
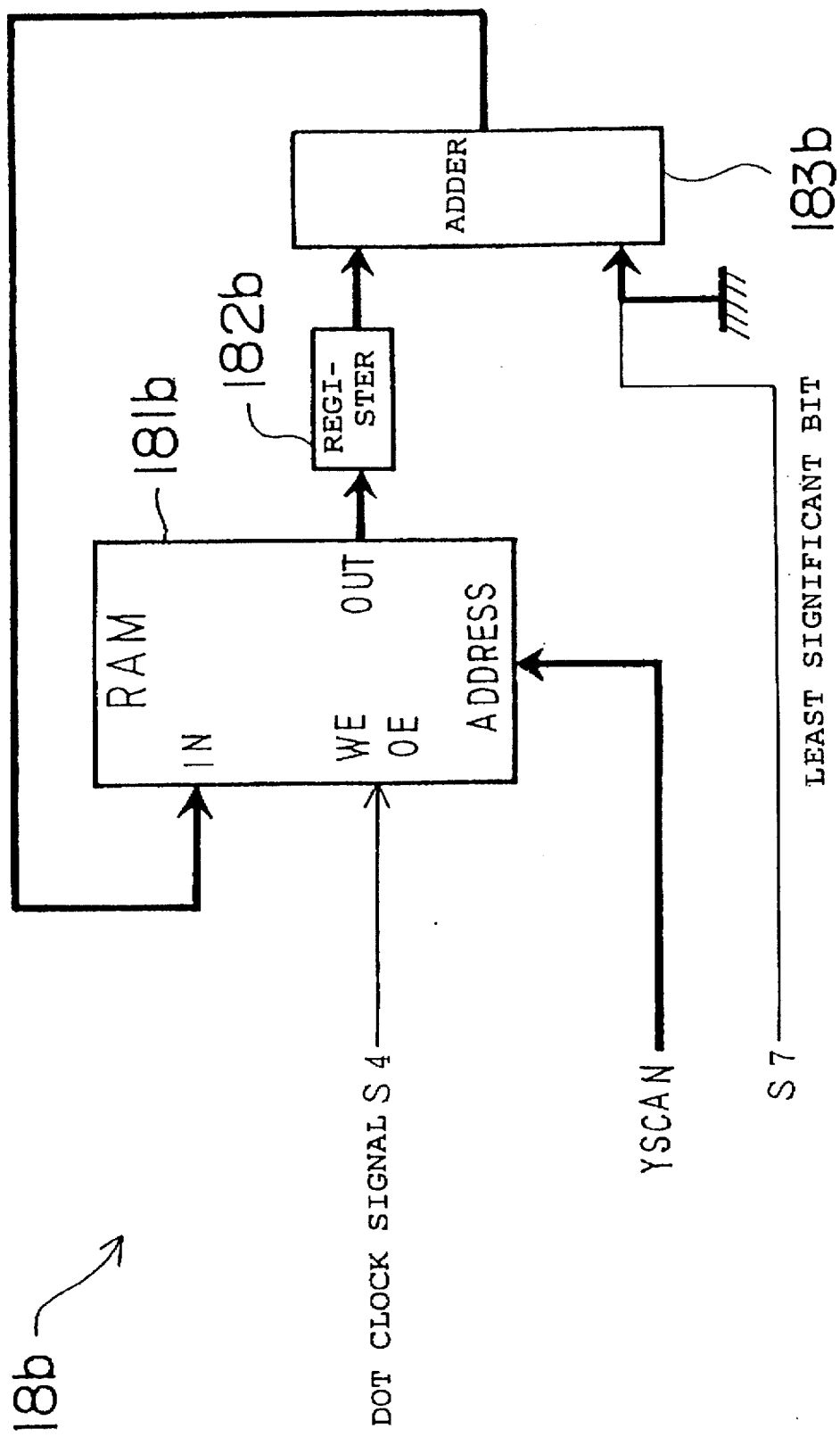
FIG. 13 is a diagram showing the arrangement of a Y-direction histogram creating circuit.

FIG. 13 illustrates the arrangement of a Y-direction histogram creating circuit 18b. The Y-direction histogram creating circuit 18b includes a memory (RAM) 181b corresponding to a Y-direction line. The memory addressing is timed with the dot clock signal S4, by using the counter output YSCAN from the window signal output circuit 14. The addressed value in the memory 181b is output to an adder 183b via a register 182b. The adder 183b adds together the least significant bit of the thus-obtained value and the value "0" or "1" indicated by the in-window binary signal S7, and supplies the resulting sum to the memory 181b to be stored at exactly the same location from which the memory value has been read. This operation is successively carried out in accordance with the counter output YSCAN, whereby a Y-direction histogram is created in the memory 181b. The creation of the X- and Y-direction histograms is started after the respective memories are cleared upon detection of the rise of the vertical synchronizing signal.

Figure 14:
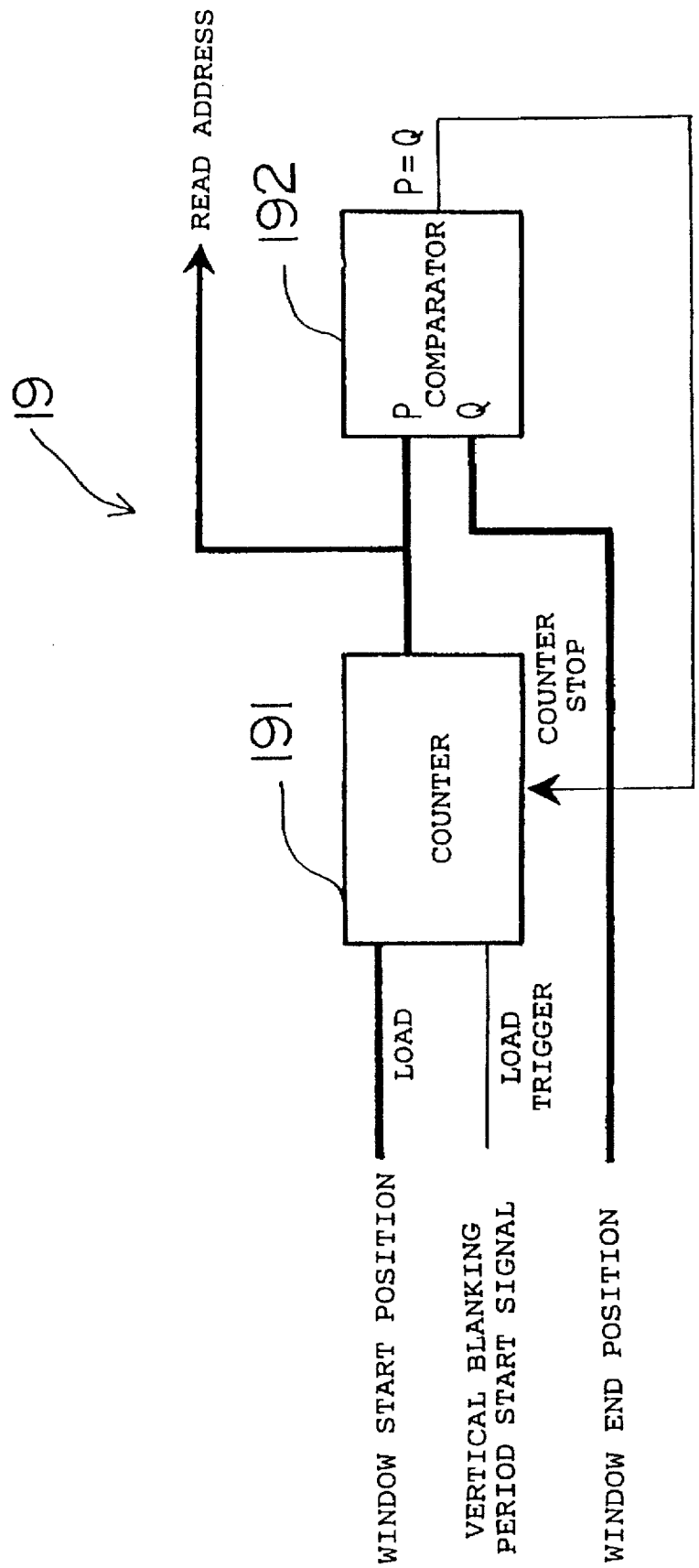
FIG. 14 is a diagram showing the arrangement of a read address generating circuit.

FIG. 14 illustrates the arrangement of the read address generating circuit. A counter 191 of the read address generating circuit 19 operates upon detecting the fall of the vertical synchronizing signal (vertical blanking period start signal), loads as initial values the window start position data Xs and Ys supplied from the window position setting circuit 20, starts counting operation, and outputs a read address corresponding to the count value. A comparator 192 compares the count value of the counter 191 with the window end position data Xe, Ye supplied from the window position setting circuit 20, and when the values coincide, the comparator 192 stops the counting operation of the counter 191.

As the read addresses are successively supplied to the memories 181a and 181b of the histogram creating circuit 18, histogram data is read from the memories 181a and 181b, as mentioned above, whereby part of the histogram data corresponding to the window area is stored in the first-in/first-out memories 21a and 21b. Since the processor is not required to read or process unnecessary data, the data processing efficiency can be enhanced correspondingly.

The loading of data into the first-in/first-out memories 21a and 21b is carried out simultaneously with the output of the read address; therefore, it is started upon detection of the fall of the vertical synchronizing signal and is completed within a vertical blanking period. The processor reads the data from the first-in/first-out memories 21a and 21b upon completion of the data loading.

Figure 15:
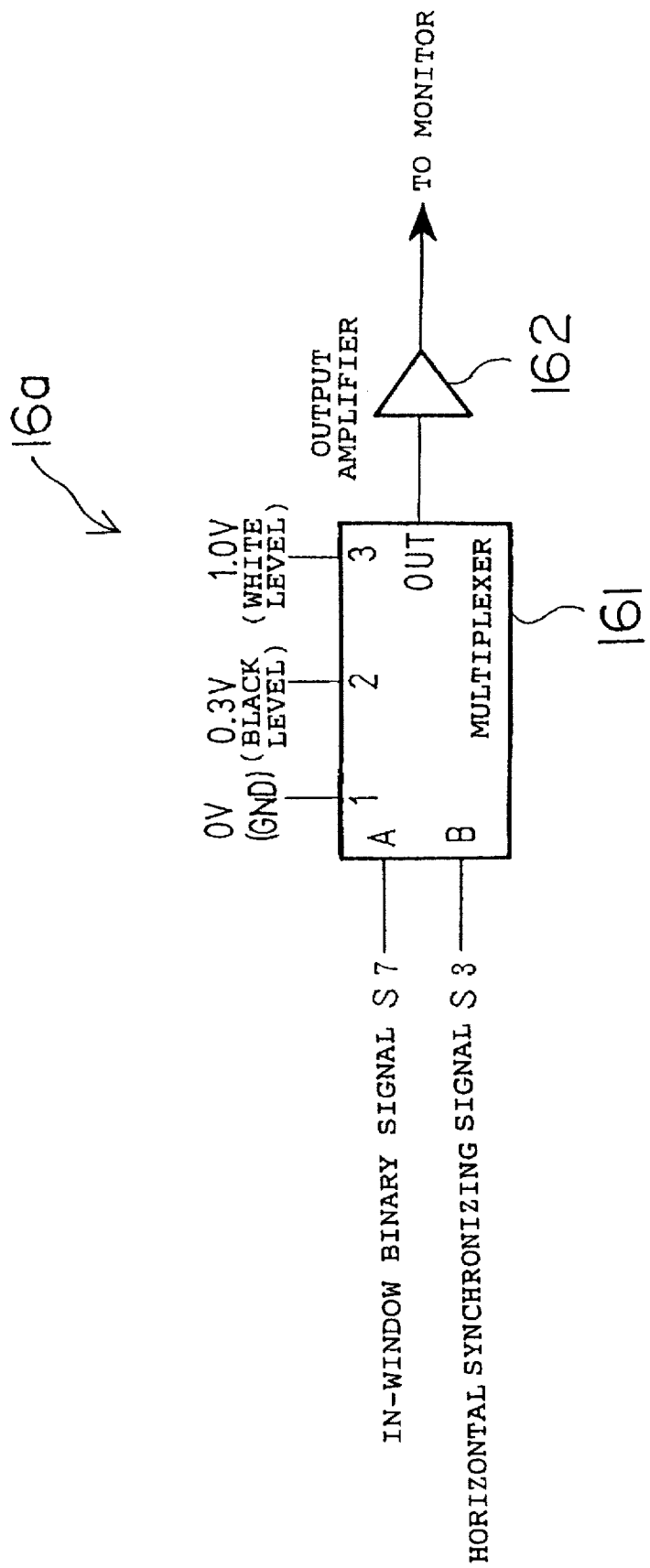
FIG. 15 is a diagram showing an example of the arrangement of a display circuit.

FIG. 15 illustrates an example of the arrangement of the display circuit. In the figure, a multiplexer 161 of a display circuit 16a displays the in-window binary signal S7 from the in-window signal output circuit 15 on a monitor screen 170, at one of the ground-level voltage 0 V, medium-level voltage 0.3 V, and high-level voltage 1 V selected in accordance with the combination of signal states of the in-window binary signal S7 and horizontal synchronizing signal S3.

Figure 16:
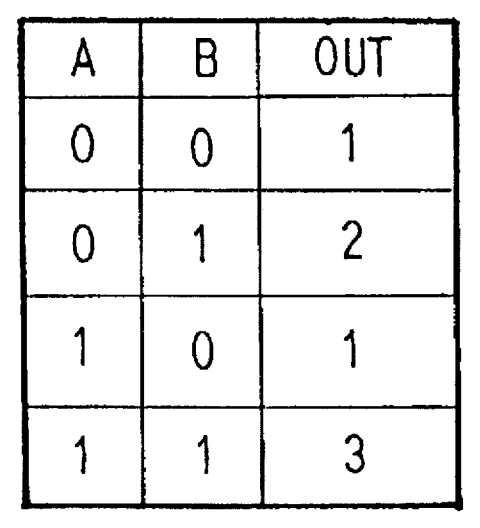
Figure 17:
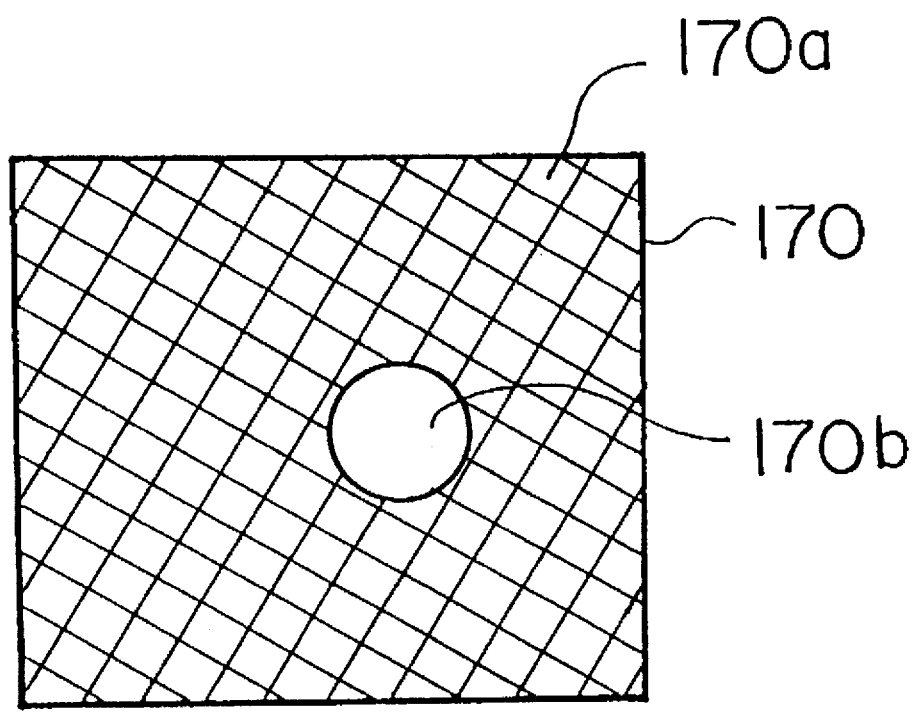
FIG. 17 is a diagram showing a monitor screen.

Specifically, one of the above voltages is output using a truth table shown in FIG. 16, in accordance with the combination of states of the in-window binary signal S7 and horizontal synchronizing signal S3. In FIG. 16, A denotes the in-window binary signal S7, and B denotes the horizontal synchronizing signal S3. The signal S7 is displayed in black when the output voltage is 0.3 V, and is displayed in white when the output voltage is 1 V, whereby the monitor screen 170 displays an image as shown in FIG. 17. In FIG. 17, the shaded part 170a represents the black portion displayed on the screen and corresponds to a region in which the in-window binary signal S7 is low-level. The blank part 170b corresponds to a region in which the in-window binary signal S7 is high-level. A horizontal scanning corresponding to one screen is executed every 33 ms, for example; therefore, the monitor screen displays a binary image on a real-time basis with no interruption.

Figure 18:
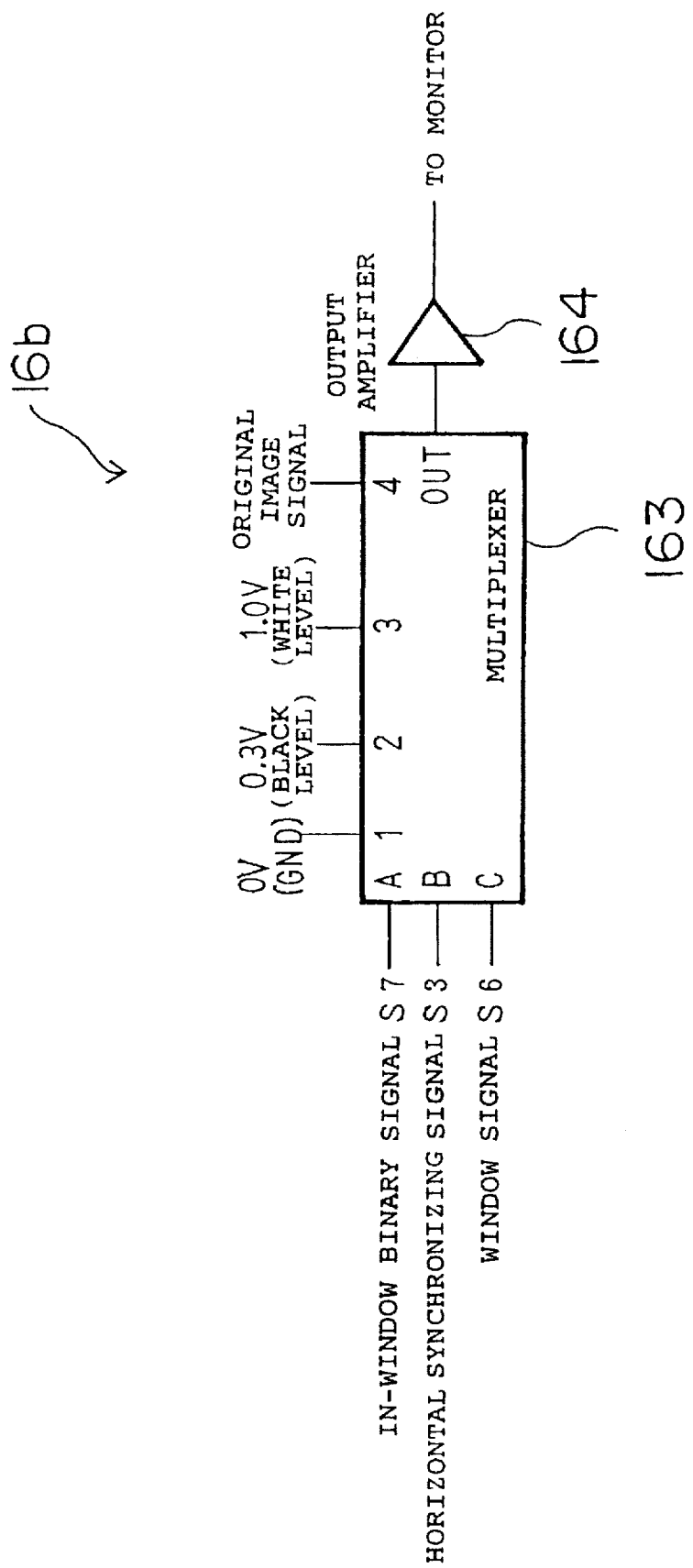
FIG. 18 is a diagram showing a second example of the arrangement of the display circuit.

FIG. 18 illustrates a second example of the arrangement of the display circuit. In the figure, a multiplexer 163 of a display circuit 16b displays the in-window binary signal S7 from the in-window signal output circuit 15 on a monitor screen 171, at one of the ground-level voltage 0 V, medium-level voltage 0.3 V, high-level voltage 1 V, and original image signal voltage selected in accordance with the combination of signal states of the in-window binary signal S7, horizontal synchronizing signal S3, and window signal S6.

Figure 20:
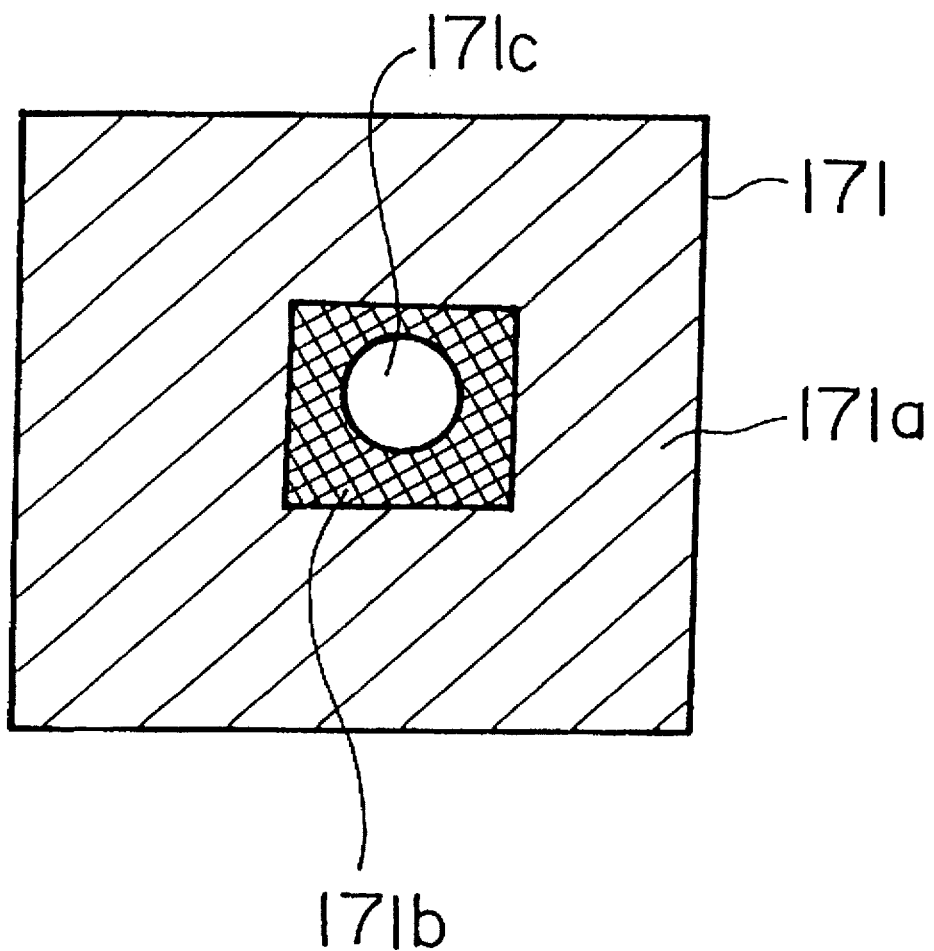
FIG. 20 is a diagram showing a monitor screen.

Specifically, one of the above voltages is output using a truth table shown in FIG. 19, in accordance with the combination of states of the in-window binary signal S7, horizontal synchronizing signal S3, and window signal S6. In FIG. 19, A denotes the in-window binary signal S7, B denotes the horizontal synchronizing signal S3, and C denotes the window signal S6. The signal S7 is displayed in black when the output voltage is 0.3 V, and is displayed in white when the output voltage is 1 V, whereby the monitor screen 171 displays an image as shown in FIG. 20. In FIG. 20, a shaded part 171a is a screen portion corresponding to the original image signal and indicates a region outside the window area. A shaded part 171b represents the black portion displayed on-screen and corresponds to a region in which the in-window binary signal S7 is low-level. The blank part 171c corresponds to a region in which the in-window binary signal S7 is high-level.

Thus, only the window area is displayed as a binary image and the region outside the window area is displayed using the original image; accordingly, the window area can be clearly distinguished, as compared with the first example.

Figure 21:
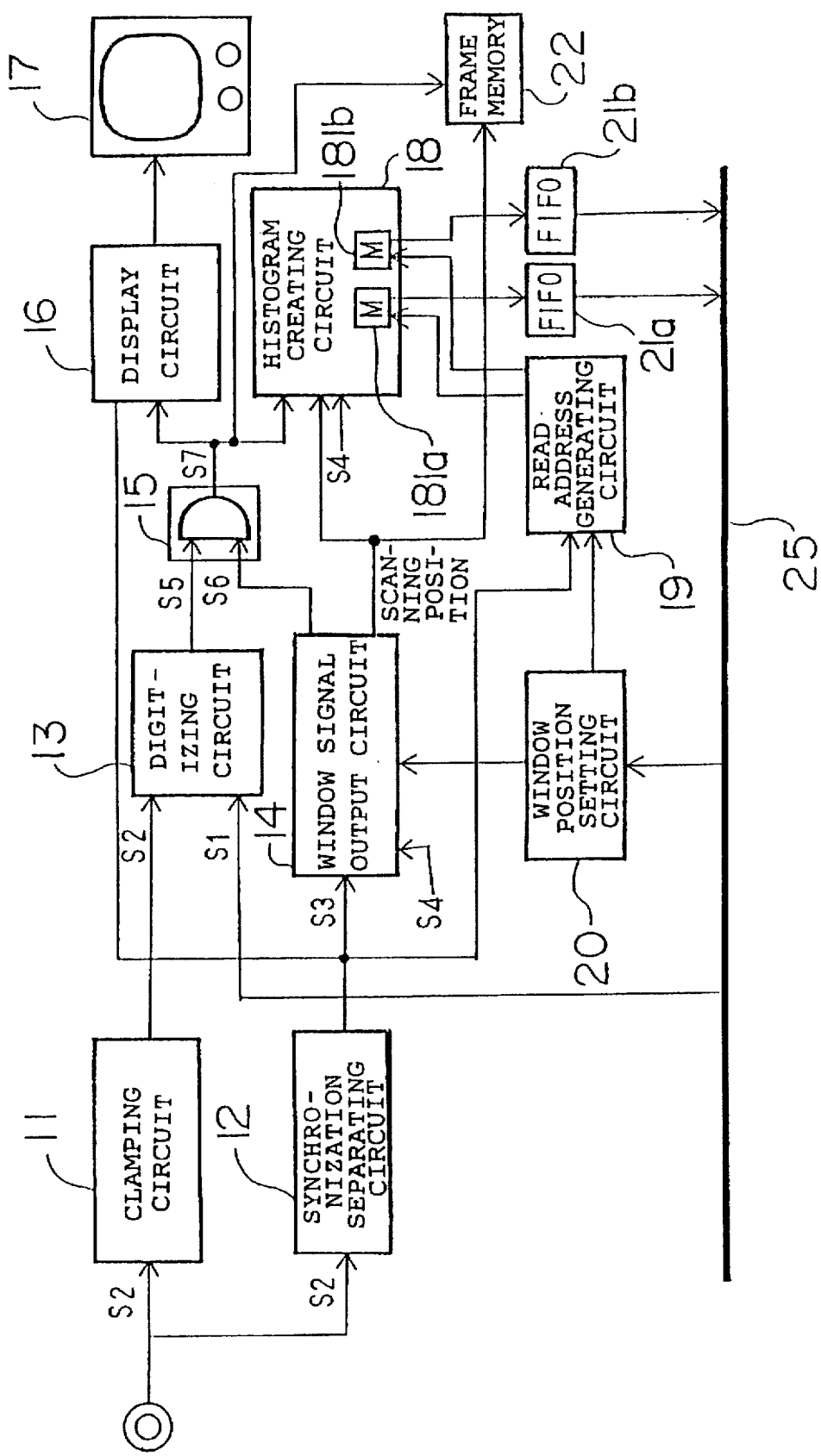
FIG. 21 is a diagram showing an example of a circuit arrangement for preserving a window binary signal.

FIG. 21 illustrates an example of a circuit arrangement for preserving the binary image in memory. The arrangement of FIG. 21 differs from that shown in FIG. 3 in that it additionally includes a frame memory 22. The frame memory 22 is supplied with the scanning position signals XSCAN and YSCAN from the window signal output circuit 14, and sets the in-window binary signal S7, supplied from the in-window signal output circuit 15, at a memory location thereof corresponding to the scanning position signals XSCAN and YSCAN. The value or bit set in the memory 22 is "1" when the in-window binary signal S7 is high-level. Since the frame memory 22 stores the results of digitization, a minimum configuration thereof is one bit deep. In the case where the frame memory 22 is an 8-bit-deep memory, all of the eight bits may be set to one.

Since the binary image is stored in the frame memory 22 in this manner, it can be read for confirmation as needed.

Figure 22:
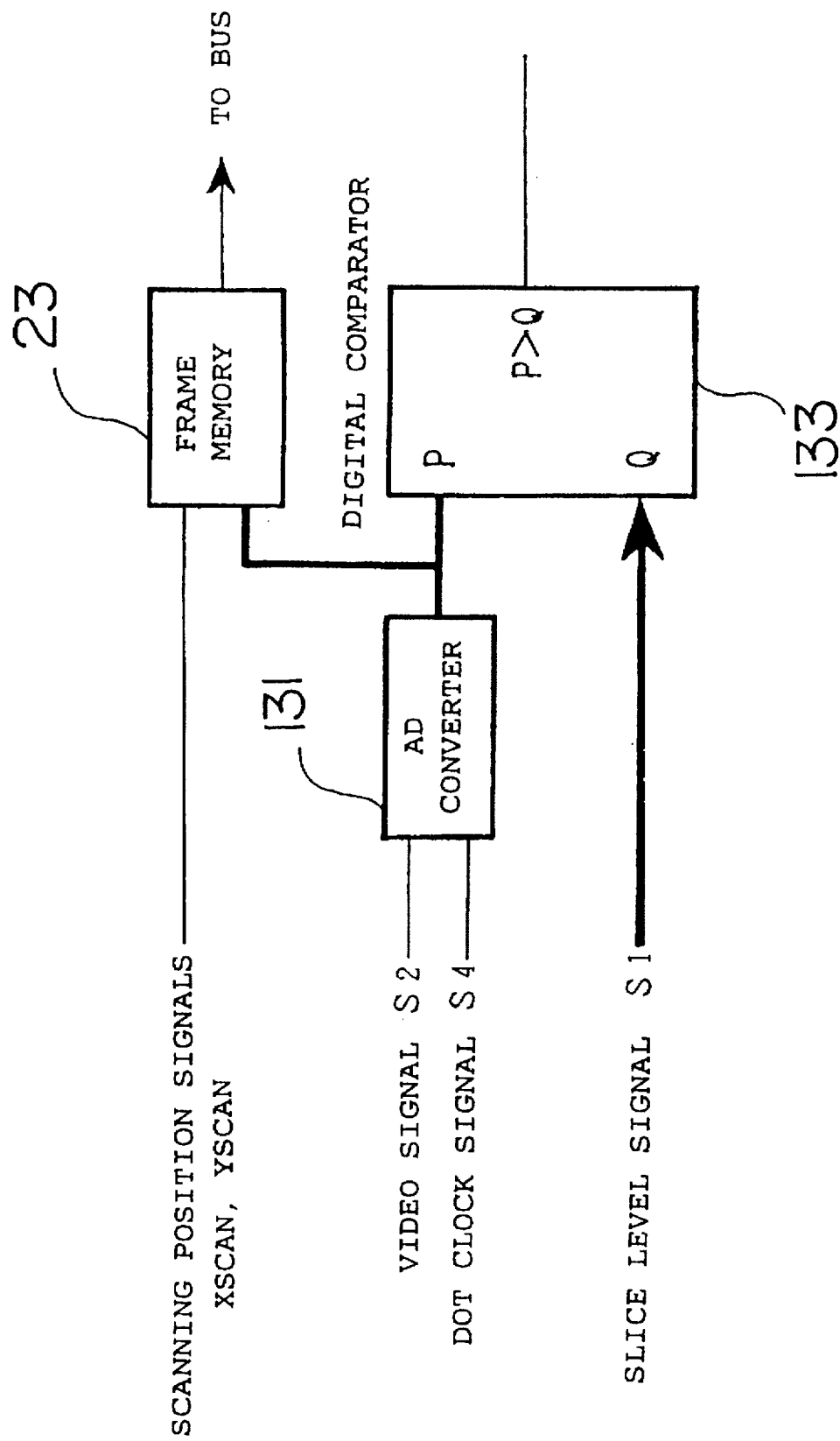
FIG. 22 is a diagram showing an example of a circuit arrangement for preserving an original image.

FIG. 22 illustrates an example of the arrangement for preserving the original image. The arrangement of FIG. 22 differs from that shown in FIG. 6 in that a frame memory 23 is additionally provided. The frame memory 23 is supplied with the scanning position signals XSCAN and YSCAN from the window signal output circuit 14, and writes the video signal S2, which has been digitized by the AD converter 131, at a memory location thereof corresponding to the scanning position signals XSCAN and YSCAN.

Figure 23:
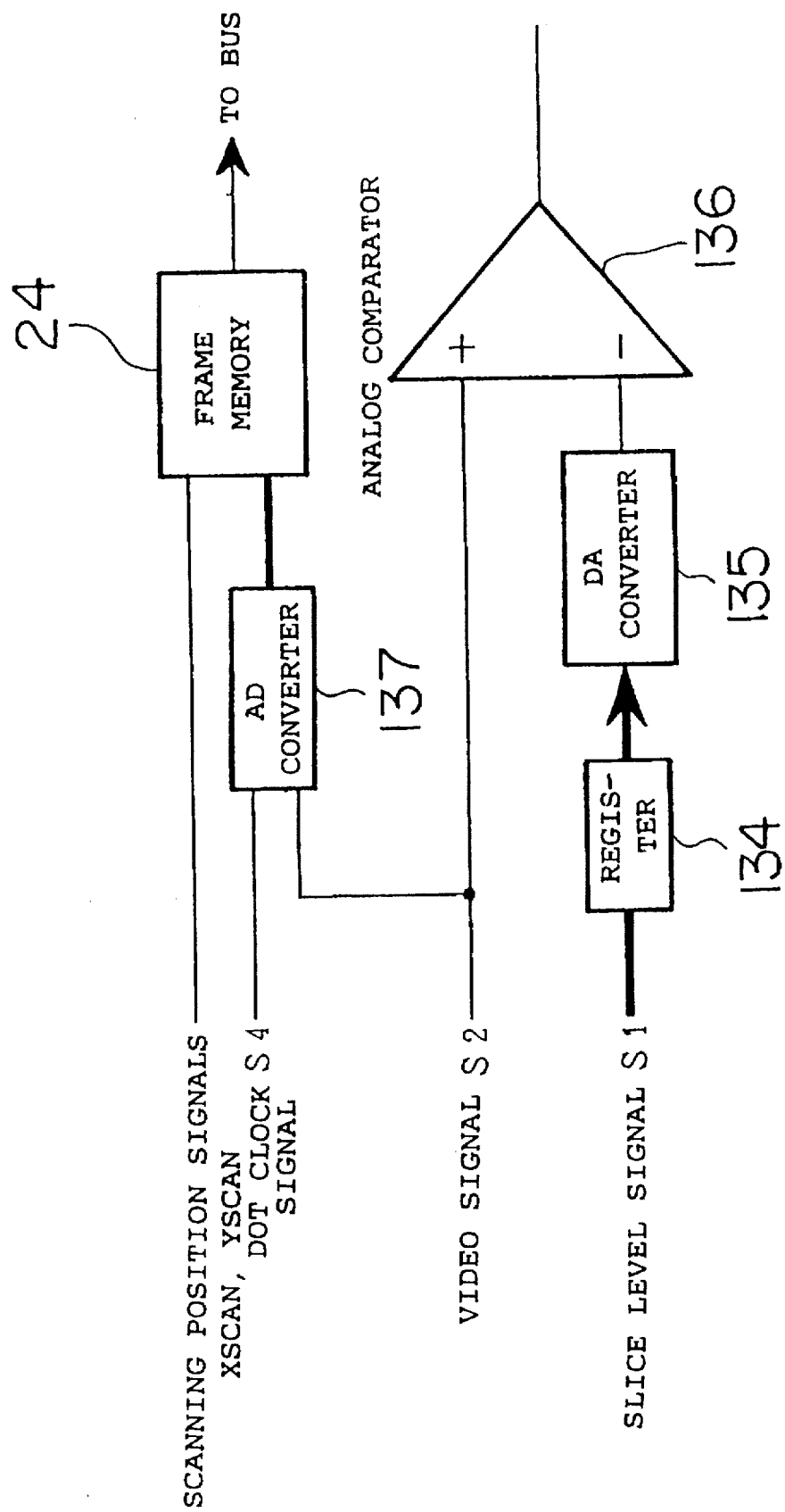
FIG. 23 is a diagram showing a second example of the circuit arrangement for preserving an original image.

FIG. 23 illustrates a second example of the arrangement for preserving the original image. The arrangement of FIG. 23 differs from that shown in FIG. 7 in that a frame memory 24 is additionally provided. The frame memory 24 is supplied with the scanning position signals XSCAN and YSCAN from the window signal output circuit 14, and writes the video signal S2, which has been digitized by an AD converter 137, at a memory location thereof corresponding to the scanning position signals XSCAN and YSCAN.

Since the video signal S2 is stored in the frame memory 23 or 24 in such a manner that it represents an original image, the video signal S2 can be read for confirmation as needed.

Figure 24:
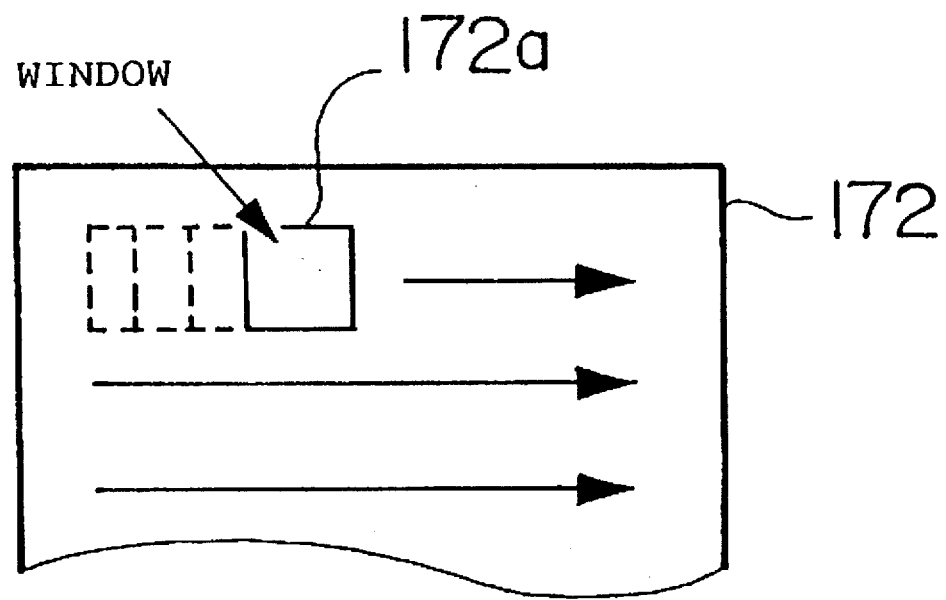
FIG. 24 is a diagram illustrating a target mark searching method.
Figure 25:
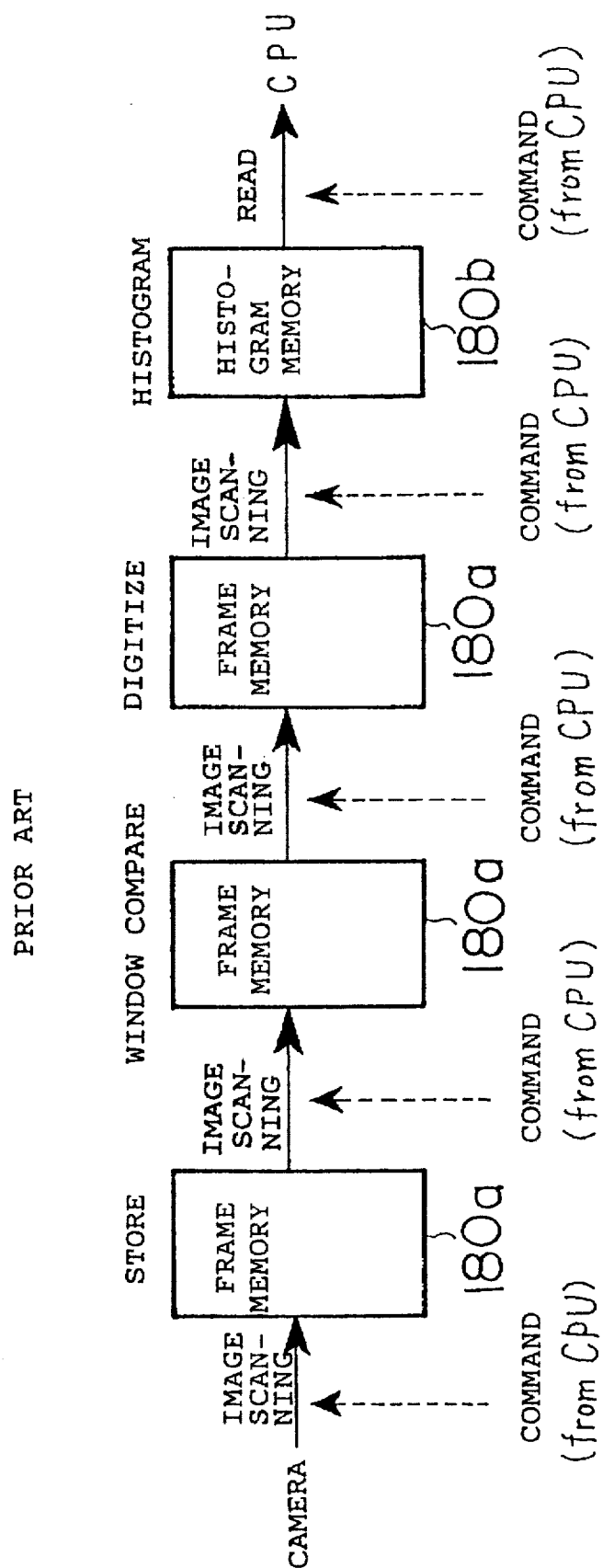
FIG. 25 is a diagram illustrating the process carried out by a conventional image processing apparatus.

FIG. 24 illustrates a method of searching for the target mark. According to the present invention, histogram data can be created by executing the image scanning only once. Since in an NTSC system, image scanning is carried out every 33 ms, histogram data is obtained every 33 ms, and thus the image processing can be carried out about 30 times in a second. Accordingly, the window position can be changed about 30 times in a second, permitting high-speed movement of the window. In the case of searching for the position of the target mark 60a with the camera 51, therefore, a window 172a is moved at high speed within a screen 172, as shown in FIG. 24, and the target mark 60a is located through examination of the histogram, thereby detecting the position of the target mark 60a.

As described above, according to the present invention, a histogram can be acquired at high speed because it can be created by scanning an image (video signal) only once. Thus, in a robot system in which a robot accesses a moving object, time required for the image processing can be greatly shortened, and the image-processed data can be fed back to the robot on a real-time basis. Accordingly, the robot can infallibly follow a moving object and grasp the same, whereby tasks can be performed quickly.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing apparatus for determining a position of an object in a production line by image processing, based on a projection histogram obtained by processing a video signal carrying an image of the object, where the video signal include at least one frame, the apparatus comprising:

digitizing means for receiving the video signal of a present frame and subjecting the video signal to scanning and slicing to obtain a binary signal;

window signal output means for receiving the video signal and outputting a window signal in accordance with a preset window area and generating and outputting scanning position data representing a scanning position for scanning the image carried by the video signal where the preset window area is less than a full frame;

in-window signal output means, directly coupled to said digitizing means and said window signal output means, for performing a logical AND operation on the binary signal and the window signal and outputting an in-window binary signal, wherein the binary signal is received by in-window signal output means without being previously stored;

projection histogram creating means, directly coupled to said in-window signal output means, for creating a projection histogram by accumulating duration of high-level status of only said in-window binary signals which are successively generated as the scanning progresses within the present frame, said projection histogram creating means comprising:

memory means, addressed in accordance with the scanning position data from said window signal output means, for storing and outputting an addressed value, register means, coupled to said memory means, for temporarily storing output data of said memory means; and adding means for receiving said in-window binary signal from said in-window output means and adding output data of said register means to said in-window binary signal, and supplying a sum thereof to said memory means as input data so that said memory means creates and stores the projection histogram from said input data, wherein a digitizing operation in said digitizing means, a window signal outputting operation in said window signal output means, and a projection histogram data creating operation in said projection histogram creating means are performed simultaneously within the present frame and the projection histogram of the present frame is thus obtained at the end of the present frame without any frame delay; and window position setting means for setting a window position defining the window area in accordance with a command from a processor side, and for outputting the set window position to said window signal output means, said window position setting means including a first register group in which is written data representing horizontal start and end positions and vertical start and end positions of the window position supplied from the processor side, and a second register group in which is duplicated the data of said first register group in accordance with a vertical synchronizing signal.

2. The image processing apparatus according to claim 1, wherein said digitizing means includes a digital comparator for comparing the video signal, which has been converted into a digital signal timed with a dot clock signal, with a slice level signal supplied thereto via a register, and for outputting the binary signal when the video signal has a level higher than that of the slice level signal.

3. The image processing apparatus according to claim 1, wherein said digitizing means includes an analog comparator for comparing the video signal with a slice level signal which is obtained by converting a signal from a register into an analog signal, and for outputting the binary signal when the video signal has a level higher than that of the slice level signal.

4. The image processing apparatus according to claim 1, wherein said window signal output means includes horizontal-direction position counting means for counting the dot clock signals each representing a horizontal position, vertical-direction position counting means for counting horizontal synchronizing signals each representing a vertical position, horizontal-direction window signal output means for outputting a horizontal-direction window signal when the horizontal position detected by said horizontal position counting means is between horizontal start and end positions of the preset window area, vertical-direction window signal output means for outputting a vertical-direction window signal when the vertical position detected by said vertical position counting means is between vertical start and end positions of the preset window area, and logical AND operation means for performing a logical AND operation on the horizontal-direction window signal and the vertical-direction window signal, and outputting a result of the logical AND operation as the window signal.

5. The image processing apparatus according to claim 1, which further comprises address generating means operated when supplied with a vertical blanking period start signal serving as a trigger signal, said address generating means starting a counting operation of a counter by loading a start position of the window area into said counter as an initial value, and stopping the counting operation of the counter at an end position of the window area, to thereby output addresses from the start position to the end position of the window area, the histogram created by said histogram creating means and stored in said memory being read from the memory in accordance with the addresses from said address generating means and stored in another memory accessible from a processor.

6. The image processing apparatus according to claim 1, which further comprises a frame memory for storing the in-window binary signal.

7. The image processing apparatus according to claim 1, which further comprises a frame memory for storing the video signal.

8. The image processing apparatus according to claim 1, and further comprising a manipulator having six degrees of freedom and carrying a video camera thereon for acquiring an image of the object and producing said video signal.

9. The image processing apparatus according to claim 1, wherein a center of gravity of the object is determined from the projection histogram obtained during each horizontal scanning period and a preset window area is rewritten to search for and determine the position of the object.

10. The image processing apparatus according to claim 1, which further comprises display means for displaying the in-window binary signal on a screen, when the video signal is of one of a ground-level voltage, a medium-level voltage and a high-level voltage selected in accordance with a combination of signal states of the in-window binary signal and a horizontal synchronizing signal.

* * * * *